United States Patent [19]

Gujer

[11] 4,072,494
[45] Feb. 7, 1978

[54] METHOD AND DEVICE FOR THE WET COMPOSTING OF ORGANIC SLUDGE

[76] Inventor: Hans Gujer, Glattalstrasse 149, 8153 Rumlang, Switzerland

[21] Appl. No.: 602,796

[22] Filed: Aug. 7, 1975

Related U.S. Application Data

[63] Continuation of Ser. No. 388,251, Aug. 14, 1973, abandoned.

[30] Foreign Application Priority Data

Aug. 25, 1972 Switzerland .................. 12644/72

[51] Int. Cl.² ............................................. C05F 11/08
[52] U.S. Cl. ........................................... 71/9; 210/15
[58] Field of Search ................. 71/9; 210/11, 12, 15, 210/63, 199, 6, 10

[56] References Cited

U.S. PATENT DOCUMENTS

| 895,229 | 8/1908 | Beddoes | 210/15 |
|---|---|---|---|
| 2,954,285 | 9/1960 | Carlsson et al. | 71/9 |
| 3,314,765 | 4/1967 | Abson et al. | 71/9 X |
| 3,444,076 | 5/1969 | Sekikawa et al. | 210/6 |
| 3,462,275 | 8/1969 | Bellamy | 210/10 X |
| 3,547,813 | 12/1970 | Robinson et al. | 210/15 |
| 3,764,290 | 10/1973 | Spohn | 71/9 |

*Primary Examiner*—Thomas G. Wyse
*Assistant Examiner*—Ferris H. Lander
*Attorney, Agent, or Firm*—Finnegan, Henderson, Farabow & Garrett

[57] ABSTRACT

There is disclosed a method and apparatus for composting organic sludge by mixing the sludge with oxygen-containing gas in a gas impermeable, rotatable drum, and cooling the drum to maintain the temperature within the drum above but near the pasteurization temperature.

14 Claims, 5 Drawing Figures

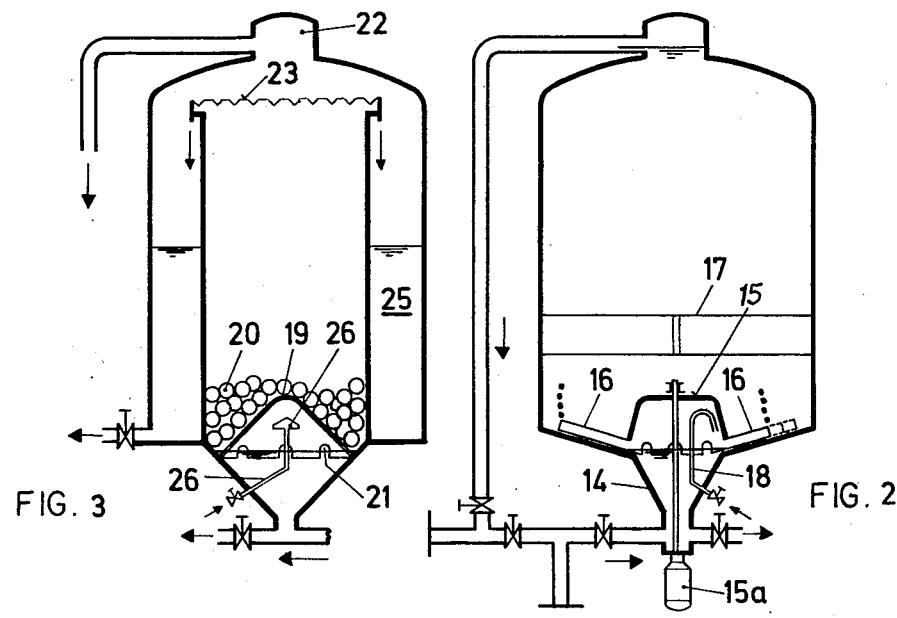
FIG. 3
FIG. 2
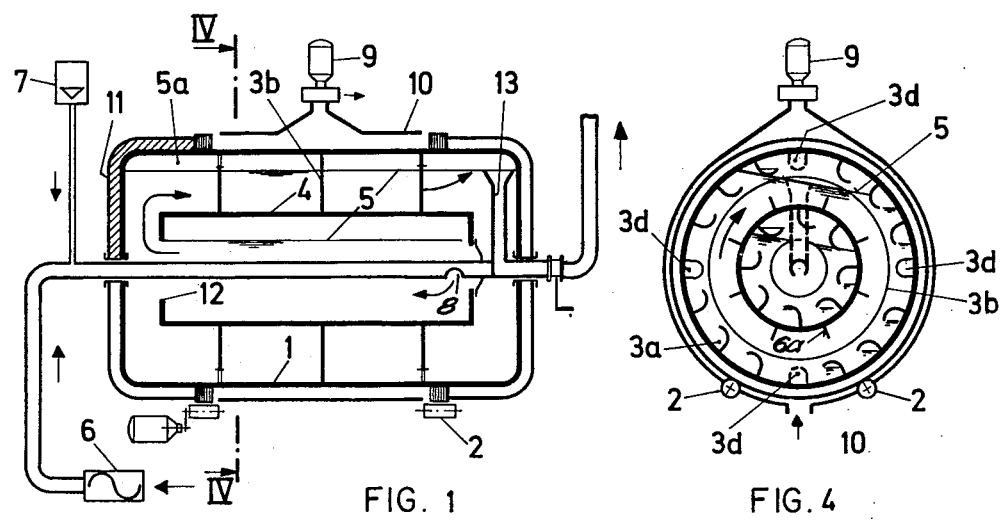
FIG. 1
FIG. 4
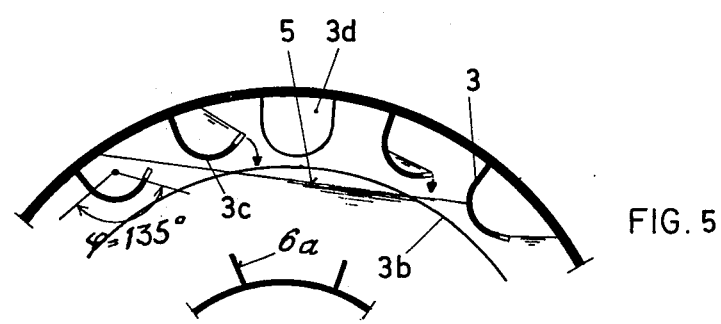
FIG. 5

METHOD AND DEVICE FOR THE WET COMPOSTING OF ORGANIC SLUDGE

This is a continuation of application Ser. No. 388,251, filed Aug. 14, 1973 now abandoned.

The present invention concerns a method for the wet composting of organic sludges, as well as a device for the execution of the procedure.

It is known that fluid, organic settling sludges, or animal dung and liquid manure can be composted in intensive ventilation due to the development of specific heat, that is, when they are in a liquid state. As long as it is a matter of sludges which contain 5% – 6% solid matter, a high-speed tubular wing (Swiss Pat. No. 497,913) appears to lend itself well to the intensive supply of oxygen. The use of this wing is limited to relatively thin sludges, because in the case of thick sludges, sufficient movement of the tank contents is no longer guaranteed. Because of the high speed of revolutions, the wing tears the solid materials so considerably that only 30% to 40% of the original solid substances are left over in the remaining filtrate. Even if a direct execution of wet composting is possible in the field, it is not, aside from the matter of transport costs, very beneficial in the matter of aqueous sludges. The treatment of the leftover filtrate is a problem that can be solved only with considerable expense in every case where a further processing or reduction in mass is desired.

The procedure of the invention, which takes these circumstances into account, is distinguished by the fact that the sludges are mixed with oxygen-containing gas under pressure in a gas impermeable or gas tight apparatus, then composted, and that the composting process is kept at at least pasteurization temperature by means of cooling.

When the known objects, e.g., fresh mechanical-biological clarifying sludges with 5% – 8% solid substance content can be treated, variations between 5% and 25% are possible with the procedure of the invention. Thus, even household refuse or organic industrial waste disintegrated in water can be composted wet, and the end product can be reduced in volume by one-third.

We proceed from the fact that the solubility of oxygen in water at the desired temperature of around 60° C falls under 50% in contrast to its solubility at the normal ambient temperature of 15° C, but that, upon increase in the absolute pressure, it increases proportionately to the pressure increase. Since in the case of sludges with a high solid matter content the mechanical separation of oxygen into fine bubbles with a large surface area is very difficult and is connected with many disadvantages, the oxygen solubility in the case of coarse-bubbled ventilation is increased by means of pressure. In the case of replacement of air by pure oxygen, the oxygen supply can theoretically be increased five times, with the same pressure and the same tank capacity.

The necessary oxygen supply is dependent upon the decomposable carbon concentration, which can vary, for instance, between thickened and unthickened clarifying sludge in the ratio of 1:5. Furthermore, the carbon portion in relation to the solid matter content can be double the amount in the case of animal waste as it is in the case of household fresh sludge, so that for that reason alone, without including special sludges (e.g., milled refuse) when air is used, pressure variations from 1-10 are necessary. When the effect of a larger oxygen concentration, up to pure oxygen, is figured in along with that, the pressures for this method could vary theoretically in the ratio of 1:50.

For reasons of tank dimensions, in the case of use of air, the pressure is limited in normal cases to around 6 atm. In the case of the use of pure oxygen, on the other hand, a pressure-free treatment of certain sludges is possible. In this case, pressure is spoken of only because it is a matter of a gas impermeable or gas tight system within which the gas is conducted from one mixing tank to another and into the fore- or post-composting by means of excess pressure.

It is known that in composting, a biological specific warming to 70°-75° C is possible. The life taking part in the composting cannot tolerate any higher temperatures thereby establishing a maximum temperature. When this temperature is reached, the only carbon which will be decomposed is the amount necessary to compensate for heat loss to the environment. Once the maximum temperature (70°-75° C) is achieved, the actual decomposition rate is not necessarily the maximum capacity of the system, but rather only the fact that the decomposition is limited to compensate for the radiation losses. The rate of decomposition can be increased by cooling the tank and a more intensive composting is effected. This connection, as well as the controlling possibilities of a composting device have been given too little attention hitherto.

Therefore, first of all it is seen to that the process is controlled by means of removing the excess heat. Only in this way can the maximum capacity be achieved.

Since pasteurization is guaranteed at a temperature of 55°-60° C, it is advantageous to maintain the process at this temperature level, which lies beneath the maximum operating temperature of 75° C. Thus, there remains a controlling realm provided by nature within which pasteurization is secured even in the case of a varying temperature which is subject to control.

The excess warmth can be removed by cooling the tank walls. The coolant, such as air or water, can be regulated by valves controlled by the temperature.

The invention is illustrated in appended drawings. They show in schematic representation.

FIG. 1 — a longitudinal cross-section of a gas impermeable mixing drum system;

FIG. 2 — a longitudinal cross-section through a revolvable air distributing mechanism in a standing container;

FIG. 3 — a stationary air distribution device;

FIG. 4 — the cross-section of the mixing drum taken along line IV—IV of FIG. 1; and FIG. 5 — an enlarged portion of the outermost mixing drum of FIG. 4.

FIG. 1 shows a gas impermeable drum 1 which rotates on roller bearings 2 about a horizontal axis (in the direction of the arrow, FIG. 4). While the drum 1 may have a single cylinder, it is preferred to use a drum with several concentric cylinders. As shown in FIG. 1, a second drum 4 is mounted within drum 1. The additional drums provide a longer path for the sludge to travel, as is explained below. Scoops 3 are fixedly mounted on the interior walls of drum 1. Preferably, as many scoops 3 as can be accommodated are used. Additional scoops 3 are mounted on their sides on separating walls 3b which are attached in turn to the drum shell and are arranged at right angles to the drum 1. These walls 3b divide the drum into chambers so that a direct flowthrough of the sludge is prevented. In order to facilitate sludge flow between chambers formed by the walls 3b, the walls are provided with openings 3d.

In FIG. 5 the buckets are represented in detail. It is essential that the curvature of the scoops 3 includes an angle greater than 135°, so that they carry a portion of the air beyond the deepest point of the drum 1 and are not emptied completely of air until they reach position 3a as shown in FIG. 4. On the exterior walls of the inner concentric drum 4, vertical plates 6a e.g., of corrugated metal, are attached; they capture a portion of the air and do not release it until they rise so that the entire capacity of the drum has had gas flow through it. The drums 1 and 4 are filled with sludge up to about 80–90% of their capacity (as shown by the sludge surface 5) so that the buckets 3 empty out the collected sludge up above the sludge surface and then, filled with gas, plunge into the sludge again. The gas which is under pressure is released into the sludge several times, whereby a good oxygen yield is achieved.

When the scoops 3 dip into the sludge, they are filled with oxygen-containing gas from space 5a above the sludge surface, which gas they gradually release into the sludge as they rotate so that gas bubbles are constantly appearing throughout the sludge. It is also possible in the sense of a kinematical reversal to keep the drums 1 and 4 stationary and to rotate the assembly with the separator walls and the buckets.

Mixing drums 1 and 4 are under a static pressure which corresponds to the depth of the sludge in the wet composting containers illustrated in FIG. 2 and FIG. 3. Therefore, the sludge must be pressurized with a metering pump 6 and the oxygen pressurized to the same pressure with a compressor 7. In the illustrated example, the sludge issues with the gas through an opening 8, through the delivery pipe into the interior of the drum 4, and wanders together with the gas out of the inner drum 4 in the direction of the arrow (FIG. 1) through the drums.

In this example, the cooling is effected by means of air, in that cold air is forced about drum 1 by a ventilator 9 mounted on top of a stationary air bonnet 10. This cool air does not come into contact with the sludge. It is, therefore, odorless and can be used for heating or drying purposes.

The mixing drums 1 and 4 can also be used for composting diluted sludges. It such a case, they are for best advantage insulated in the front (FIG. 1) so that the excess heat is available for removal. The sludge level 5 is maintained in the inner drum 4 at the level of an overflow lip 12, in the outer drum 1 by means of an overflow pipe 13, whereby it is necessary that the overflow pipe 13 can be moved radially. The rotational speed of the drums is normally about 10–15 rpm. The advantage of these mixing drums consists in the fact that sludge which is barely capable of being pumped can be aerated under high pressures, e.g., up to about 6 atm., and that the energy put into the air compression can be utilized by means of the repeated passage of the air through the material. As a result of the great distance over which the sludge is forced to travel, a safe and certain pasteurization is achieved in spite of continuous activity. The mixing drum may also be used in cases where the exhaust is to be used because, in the case of high pressures, only a little heat is discharged with the used air through evaporation of water; for the course of the steam pressure curve depends upon the absolute pressure, and its rise in the i-x diagram becomes steeper as the absolute pressure increases. At constant temperatures, the saturation point of the air is therefore lower at higher pressure than it is at lower pressure. Therefore, if one works with higher pressure, one manages to cool the sludge less with the same amount of air since less water is evaporated and therefore less evaporation heat is extracted from the sludge.

FIG. 2 shows a section through a vertical container for the post-composting, represented purely schematically. Sludge and gas from the mixing container (FIG. 1) are conveyed together into a hopper bottom 14. The gas collects in a gas holder 15 to which a number of pipes 16 of varying length, open on the bottom, are attached. The holder 15 and pipes 16, driven by a motor 15a, revolve slowly and distribute the gas bubbles issuing from the pipes 16 evenly over the entire area. An attached stationary cross 17 retards the rotating movement of the gas to a large degree, so that the gas rises almost vertically. Upon this rising, oxygen is dissolved, whereby correspondingly the solubility of the gas release declines. Similarly, corresponding to the degree of decomposition of the sludge, the need for oxygen declines, so that in wet composting the right amount of oxygen is available in every spot. These standing containers offer an ideal possibility of exploiting the energy put into the compression of the gas. Through a stationary washing pipe 18, the gas entrance openings in the pipes 16 can be washed clean periodically as they rotate by.

While in FIG. 2 a rotating air distribution mechanism for containers of greater diameter is shown, FIG. 3 shows a simple, stationary distribution device. In the holder 19, ring openings 21 are arranged at an equal height, above which loose balls 20 are provided, the specific weight of which is about 20–30% greater than that of the sludge, so that they are kept in motion by the issuing gas in the manner of a fluidized bed, whereby they distribute the air to a larger area. A gas chamber 22 in the last container is only under the excess pressure that is necessary for ridding the exhaust air of odor. The gas issues onto the sludge surface, while the sludge falls over an overflow lip 23 into a collecting tank 25. The falling sludge shatters the foam forming in consequence of the release of gas.

In the case of lower pressures, a container as shown in FIG. 3 can suffice for release. In the case of higher pressures, two or more of such containers are connected to each other. Upon release of the gas, the gas volume increases and parallel to it the steam absorption power, so that toward the end a cooling of the sludge automatically takes place due to evaporation heat which is passing off.

The operation described allows for a far-reaching practical use of the familiar and interesting phenomenon, that organic sludges can be composted in a wet state. This process is securely controllable and can be conducted continuously. First of all, it can be used on a variety of sludges with various solid matter contents. Sludges can be condensed a great deal before composting, which offers the following advantages:

1. The filtrate which is separated before the wet composting contains only a small amount of dissolved substances and can be processed easily.

2. Savings on the matter of storage and transport are made possible.

3. Even sludges with very little decomposable carbon can be brought to the desired temperature, because less balast water need be heated up with it.

4. The treatment chambers and, thus, the radiation losses become smaller, and the excess heat for further use greater. Thanks to the maximum capacity achieved, the composting times can be reduced to 4–8 days.

For various reasons there seems to be a tendency today toward biological farming, wherein the decomposition of organic substances is carried out to the extent possible on the fields of cultivation. The new method makes possible a short-term composting with the main purpose of pasteurization, in that the process is discontinued as soon as the sludge can be used further without the problem of odor. This is possible in a fraction of the time of the entire process, i.e., in 2–3 days.

The invention in its broader aspect is not limited to the specific details shown and described and departures may be made from such details without departing from the principles of the invention and without sacrificing its chief advantages.

What is claimed is:

1. A method for wet composting organic sludge comprising feeding the sludge to be treated into a continuous flow system including a gas-tight mixing container together with an oxygen-containing gas for promoting a composting reaction in the sludge, maintaining a static pressure in the mixing container within a range above 1 atmosphere and up to 6 atmospheres, said static pressure being developed by the composted sludge after flowing through said container, and simultaneously maintaining the temperature within the flow system within a range above 55° C. and less than 75° C.

2. The method of claim 1, including the step of continuously transferring the composted sludge-oxygen mixture against said static pressure from the mixing container into a vertically extending, gas-tight, post-composting container, and aerating the composted sludge with the unused oxygen from the sludge-oxygen mixture flowing with said sludge from said mixing container directly into said post-composting container.

3. The method of claim 1, wherein said gas is air enriched with oxygen.

4. The method of claim 1, wherein said gas is pure oxygen.

5. A method for wet composting organic sludge in a continuous flow system comprising
   statically pressurizing a gas-tight mixing container in the system within a range above 1 atmosphere and up to 6 atmospheres;
   force-feeding the sludge to be treated and an oxygen-containing gas for promoting a composting reaction in the sludge through said statically pressurized container;
   continuously intermixing oxygen-containing gas accumulating in the upper areas of said container with said sludge throughout said container; and
   maintaining the temperature of the container not to exceed 75° C.

6. The method of claim 5 wherein the step of force-feeding the sludge and oxygen-containing gas through the container includes the step of providing a tortuous path through said container for repeated passage of the gas through the sludge.

7. The method of claim 6 wherein the container is cylindrical and is positioned with its longitudinal axis substantially parallel with the ground and wherein the step of continuously intermixing includes the step of rotating the container along its longitudinal axis.

8. The method of claim 7 wherein the step of rotating the container includes the step of carrying the oxygen-containing gas accumulating in the upper parts of the container back into the sludge in the lower parts of the container.

9. The method of claim 5 wherein the step of pressurizing the container includes the step of building a pressure head of the composted sludge force-fed through the container.

10. The method of claim 9 also including the step of treating the composted sludge forming said pressure head.

11. The method of claim 10 wherein the step of treating the composted sludge in the pressure head includes the step of aerating the composted sludge with the unused oxygen content of the gas passing through said container with the composted sludge into the pressure head.

12. The method of claim 11 wherein the step of aerating includes the step of distributing the unused oxygen across the lower area of the composted sludge forming said pressure head.

13. The method of claim 12 wherein the step of distributing the unused oxygen includes the steps of collecting the unused oxygen and letting the collected oxygen escape through rotating passages of varying length.

14. The method of claim 12 wherein the step of distributing the unused oxygen includes the steps of collecting the unused oxygen and letting the collected oxygen escape through an aggregation of loose balls into the composted sludge forming the pressure head.

* * * * *